United States Patent [19]

DeRoss et al.

[11] Patent Number: 5,085,114
[45] Date of Patent: Feb. 4, 1992

[54] METHOD FOR FACILITATING REMOVAL OF INSULATION FROM WIRES

[75] Inventors: Robert W. DeRoss, Naperville; Ronald Dudek, Orland Park; Dennis Stanhibel, Justice, all of Ill.

[73] Assignee: Molex Incorporated, Lisle, Ill.

[21] Appl. No.: 576,888

[22] Filed: Sep. 4, 1990

[51] Int. Cl.$^5$ .............................. H02G 1/12
[52] U.S. Cl. ........................ 83/861; 83/947; 81/9.51; 30/90.6
[58] Field of Search .............. 83/879, 880, 883, 947, 83/924, 861; 30/90.6, 90.8, 91.2, 91.1; 81/9.51

[56] References Cited

U.S. PATENT DOCUMENTS

| | | | |
|---|---|---|---|
| 1,022,679 | 4/1912 | Huston | 30/90.6 |
| 2,054,973 | 9/1936 | Ferguson | 30/91.1 |
| 3,237,300 | 3/1966 | Townsend et al. | 30/90.6 |
| 3,599,514 | 8/1971 | Fornkahl | 30/90.6 X |
| 3,696,509 | 10/1972 | Lancaster | 30/90.6 |
| 3,914,864 | 10/1975 | Prince | 30/90.6 |
| 4,117,749 | 10/1978 | Economu | 30/90.6 |
| 4,447,949 | 5/1984 | Kane | 30/90.6 |
| 4,628,599 | 12/1986 | Bernier, Jr. et al. | 83/947 X |

*Primary Examiner*—Frank T. Yost
*Assistant Examiner*—Rinaldi Rada
*Attorney, Agent, or Firm*—Stephen Z. Weiss; Charles S. Cohen; A. A. Tirva

[57] ABSTRACT

An apparatus for placing slits in wire insulation including a pair of opposed cutting blade assemblies moveable toward the wire to penetrate the wire insulation down to the conductor. The cutting blade assemblies are configured to create one or more sections of the insulation which will completely separate from the wire conductor, or which will be held together remaining in contact with the wire conductor with a small unslit insulation portion.

2 Claims, 4 Drawing Sheets

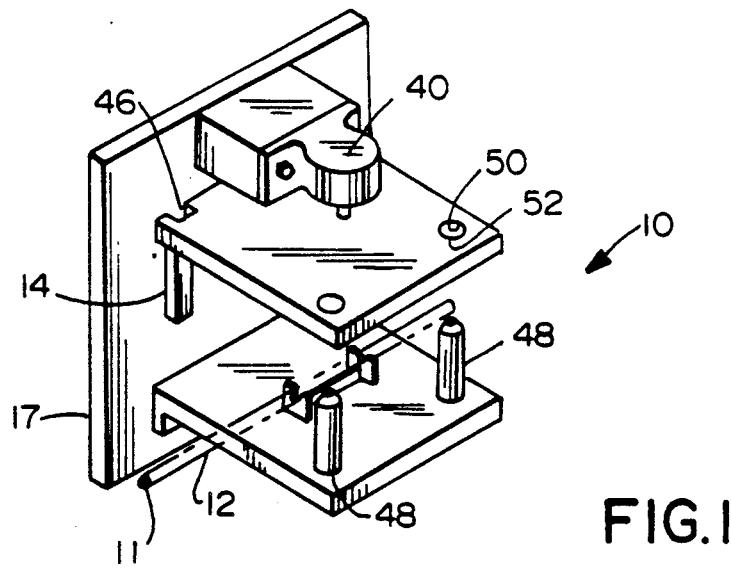
FIG.1
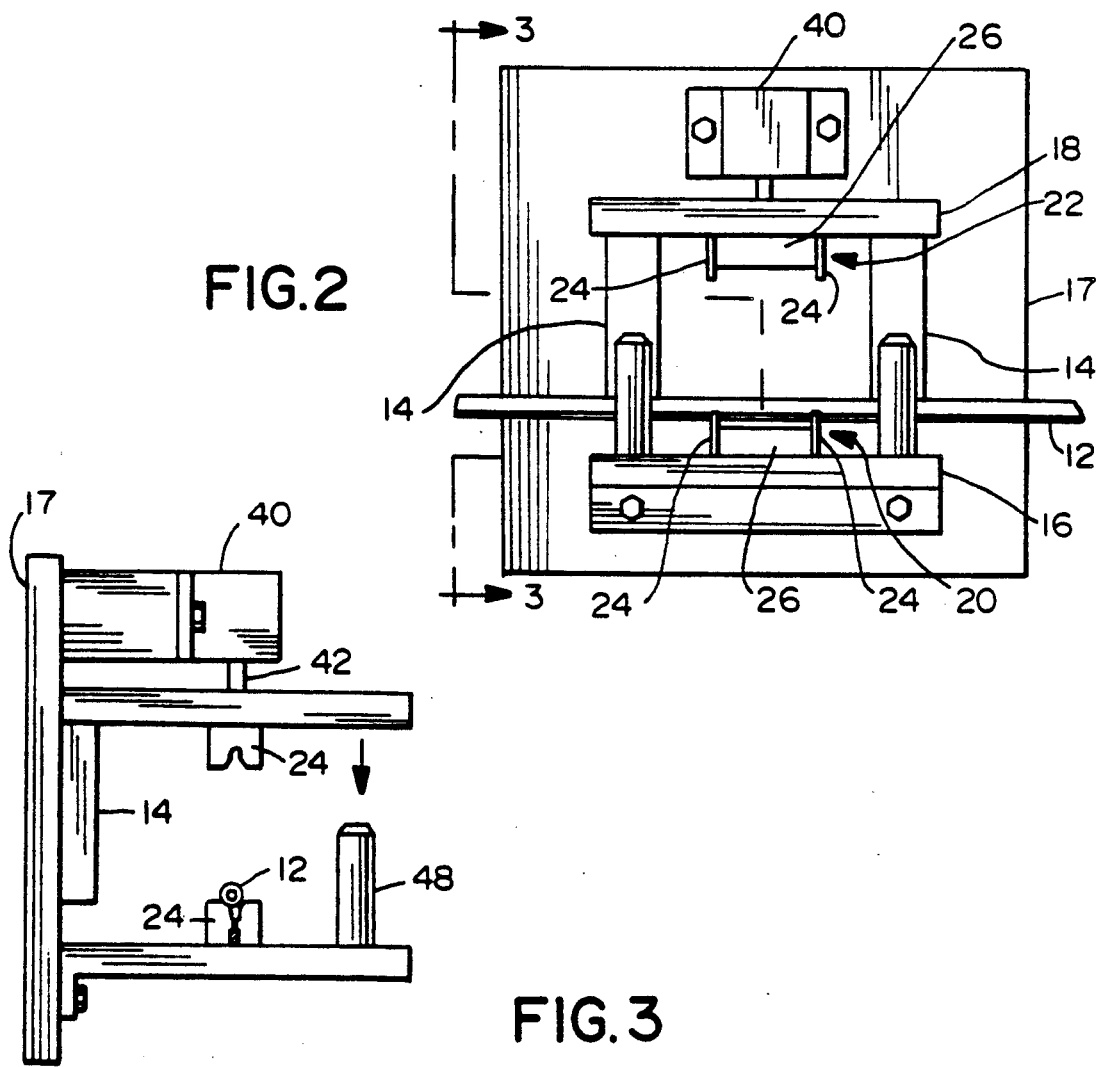
FIG.2
FIG.3

METHOD FOR FACILITATING REMOVAL OF INSULATION FROM WIRES

BACKGROUND OF THE INVENTION

1. Field of The Invention

This invention relates to a method, apparatus, tool or machine used for slitting insulation covering conductors and wires. After slitting, the insulation may drop off the conductor or may be removed from the conductor by hand or by machine.

2. Description of Related Art

In the manufacture of electrical connectors, it sometimes is desirable to have insulation removed from a wire to expose its conductor prior to connection with a terminal.

Some examples of insulation removal tools for machines are discussed below. U.S. Pat. No. 3,471,916 discloses a tool having knives attached to a mandrel which scrap the insulation and oxides off the conductor as the wire is pulled over the mandrel. U.S. Pat. No. 2,521,688 discloses shearing insulation longitudinally off one edge of each wire, and cutting insulation perpendicular to the wire at the beginning and end of the area to be stripped. U.S. Pat. No. 3,748,932 discloses insulation which first is slit by knives while the wire is moved longitudinally and thereafter cut perpendicularly to the wire with separate cutting blades. These cutting blades not only cut a portion of the insulation but also cause the severed portion of the insulation to buckle away from the conductor to insure that the insulation portion between the perpendicular cuts are removed. U.S. Pat. No. 4,594,921 discloses stripping of insulation from a coaxial cable with heated blades by first making a circumferential cut while the cable is rotating about its longitudinal access and a longitudinal cut with longitudinal movement of the cable.

Although the prior methods of removing insulation have worked well, an attempt has been made to make an insulation slitting apparatus less costly and with fewer moving parts. Also an apparatus was desired which could make slits in the insulation while allowing the slit section to remain in contact with the conductor and easily stripable from the conductor by hand or machine. By allowing the insulation to remain in place until just prior to termination, the conductor is protected from damage caused by the environment. Such damage would include oxides caused by the conductor coming in contact with chemicals or moisture. The presence of oxides on the outer surface of the exposed conductor could result in an incomplete connection or require chemical treatment to remove the oxide barrier. Also, by having the slit section of insulation remain in contact with the conductor until just prior to termination, a stranded type of conductor is prevented from unraveling or untwisting. When untwisting occurs the cross section of the stranded conductor increases which makes it more difficult and sometimes impossible to insert into a crimp type terminal. Finally, scraping the outer surface of the conductor is required in some prior methods of insulation removal. With certain conductors such as the braided type, there is a plated layer on the outer surface. Any scraping will tend to remove this thin outer plated layer.

This invention is directed to solving the above problem by providing a machine with few parts which can slit the insulation of a wire without scraping the conductor surface.

SUMMARY OF THE INVENTION

It is an object of the invention to provide a new and improved apparatus for placing slits in wire insulation surrounding a conductor in a wire to facilitate removal of a portion of the insulation.

In the exemplary embodiment of the invention is an apparatus for slitting insulation surrounding a conductor in a wire to facilitate removal of a section of insulation. A pair of opposed cutting blade assemblies is provided with at least one end blade generally perpendicular to the wire for cutting a circumferential slit in the insulation and on at least one of the assemblies a straight blade generally parallel to the wire for cutting a longitudinal slit in the insulation leading away from the circumferential slit. At least one of the end blades and straight blade is configured to define a gap which will leave at least one narrow unslit tab section of the insulation, which retains a section of the insulation bounded by slits, on the conductor and which slit bound insulation can be torn to remove the section with little force. Means are also provided to move the opposed blade assemblies toward and away from each other with the wire located therebetween to cut said slits.

In other embodiments either the end blade or the straight blade or both is non continuous. The non-continuous section of either of the blades creates an unslit section or tab of the insulation. This unslit tab section is located either between a removable insulation section bounded by slits and an unslit non-removable insulation section or between one or more removable insulation sections bounded by slits.

These and other objects and advantages of the invention will become apparent from the following detailed description and drawings.

BRIEF DESCRIPTION OF DRAWINGS

FIG. 1 is a perspective view of a tool embodying the concepts of the invention with the opposed blade assemblies located on the sliding die set plates in the open position.

FIG. 2 is a plan view of the tool shown in FIG. 1.

FIG. 3 is a side view of the tool shown in FIG. 1 in the open position.

DETAILED DESCRIPTION OF THE PREFERRED EMBODIMENT

Figure 4:
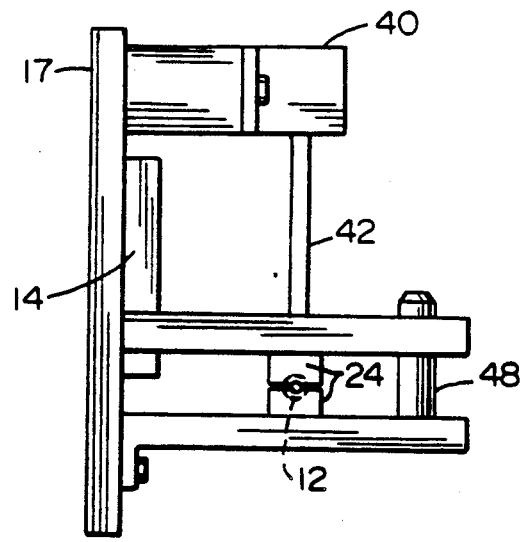
FIG. 4 is a side view of the tool shown in FIG. 1 in the closed position.

FIG. 1 of the drawings illustrates a new and improved apparatus for placing slits in insulation 11 to wire 12. FIG. 2 shows a wire 12 having ends 14 which wire has been pulled manually or with a mechanism not shown between a stationary die set 16 affixed to mounting plate 17 and a movable die set 18. The wire 12 is resting on a stationary blade assembly generally designated 20 which is affixed to the stationary die set 16. Affixed to the stationary die set 16 is a movable blade assembly generally designated 22. The stationary blade assembly 20 and movable blade assembly 22 are lined up to be directly opposed to one another and normally spaced apart from each other.

The opposed blade assemblies 20, 22 in this preferred embodiment are identical to one another. But it is understood that other arrangements can be made where the assemblies are not identical. The identical assemblies 20, 22 each include two end blades 24 perpendicular to the longitudinal axis of wire 14 and a straight blade 26 parallel to the longitudinal axis of the wire 14 and in a plane passing through the wire's centerline.

Figure 5:
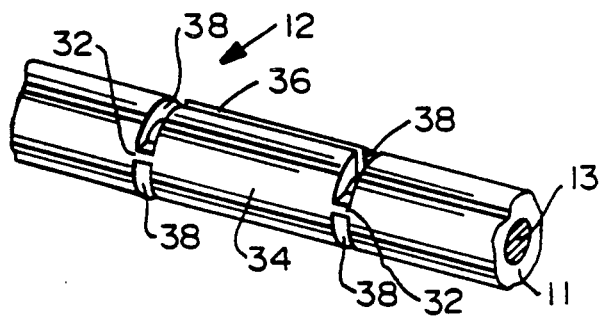
FIG. 5 shows the slit configuration cut by the blades of FIGS. 1, 4 and 6.
Figure 6:
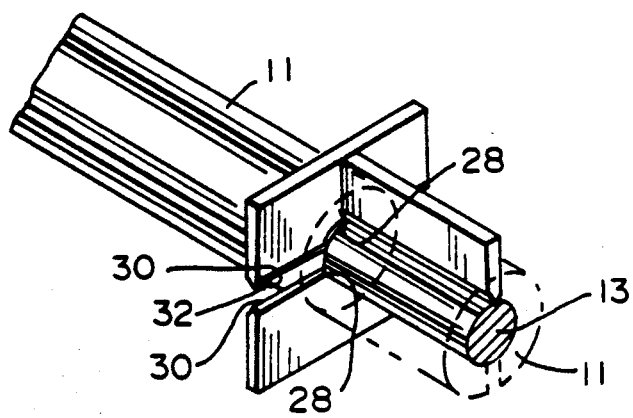
FIG. 6 is a perspective view in section of the opposed blade assemblies in contact with the wire insulation where the invention is in the closed position of FIG. 4.

To make the slit arrangement appearing in FIG. 5, the end blades 24 must be configured as they appear in FIGS. 1–4 and 6. The end blades 24 have a curved section 28 which is designed to coincide with a portion of the circumference of the conductor 13 when the blades are in their closed position as shown in FIG. 6. This curved section 28 will cut the insulation all the way through to the conductor 13. The end blade 24 configuration also has two straight end sections 30. These straight end sections 30 in this configuration are not long enough to completely cut through the insulation thereby leaving unslit tab sections 32 of the insulation. These unslit tab sections 32 will hold the section of the insulation bounded by slits in place remaining in contact with conductor 13. However, the unslit tab sections 32 are narrow enough to be torn by manual or machine manipulation. Located between and affixed to the two end blades 24 is at least one straight blade 26. This straight blade 26 is designed to penetrate the insulation all the way through to the conductor 13 forming a continuous longitudinal slit 36 between the partial circumferential slits 38.

Means are provided to move the movable blade assembly 22 toward the stationary blade assembly 20. An air cylinder 40 is affixed to mounting plate 17 and includes a piston shaft 42 attached to movable die set 18. As the air cylinder 40 acts upon the movable die set 18, proper alignment of the movable die set 8 with the stationary die set 16 is maintained by slots 46 sliding along alignment guides 14 affixed to mounting plates 17 and guide bushings 50 force fit into guide apertures 52 sliding along guide pins 48'

Figure 7A:
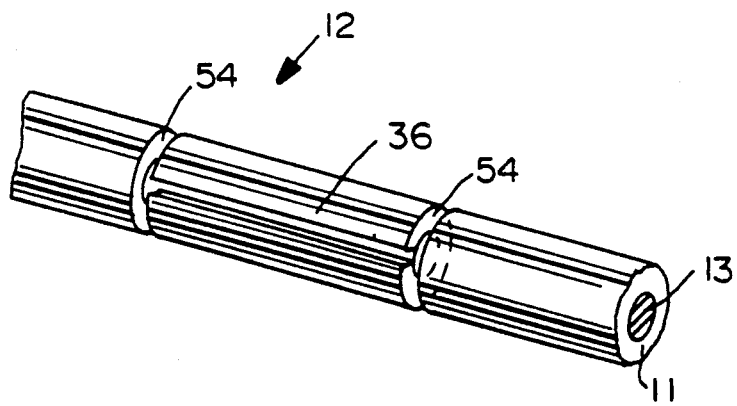
FIGS. 7a–d show variations of the slit configuration in the insulation.

Many different slit arrangements can be made with simple variations in the slitting edge configuration of the end blades 24 and straight blades 26. FIG. 7a shows one continuous longitudinal slit 36 and two continuous circumferential slits 54. Though there is no unslit portion in this configuration, the insulation bounded by slits 36, 54 will stay in loose fit contact with the conductor 13 since the plasticity of the insulation 11 will maintain the circular shape of the insulation 11 around and thereby gripping the conductor 13.

Figure 7B:
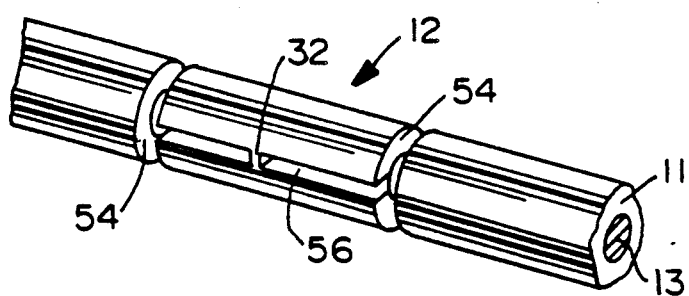
Figure 7C:
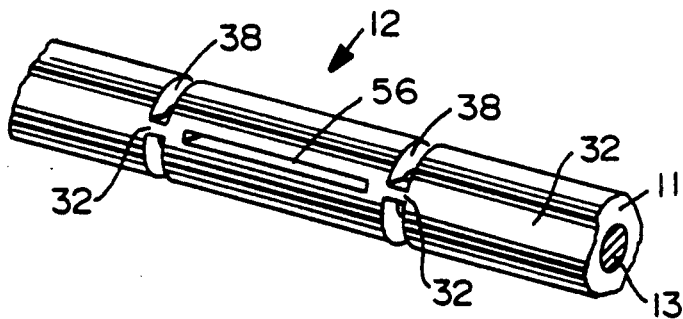
Figure 7D:
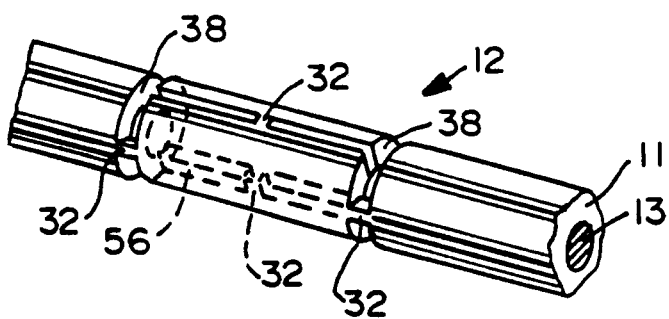
Figure 9:
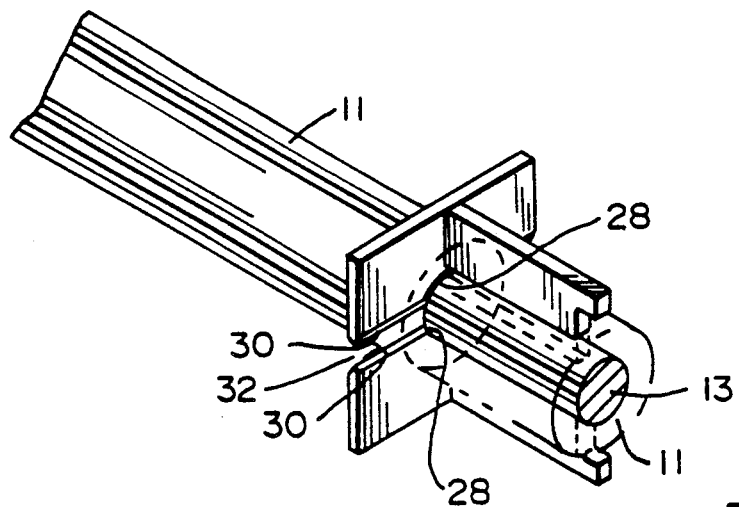
FIG. 9 is a perspective view of the opposed blade assemblies in contact with the wire insulation which will result in the slit configuration of FIG. 8.
Figure 8:
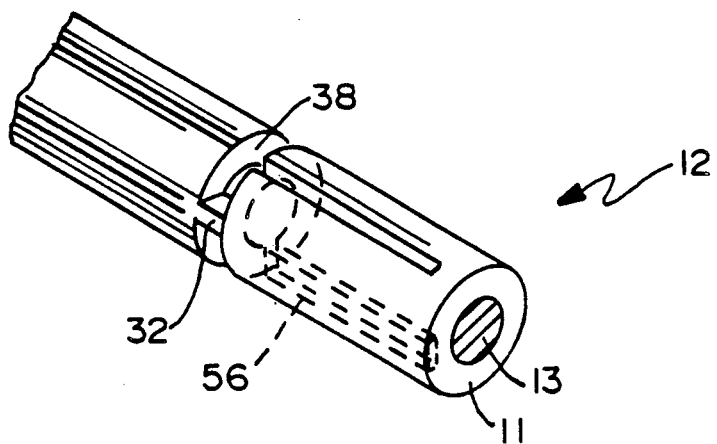
FIG. 8 is an end of wire slit configuration cut by the blade assembly shown in FIG. 9.

FIG. 7b shows two continuous circumferential slits 54 and one or two partial longitudinal slits 56. The partial longitudinal slits are formed by a straight blade having a non-continuous slitting edge. Unslit tab sections 32 keep the slit insulation section connected to itself or to another slit section and thereby in contact with the conductor 13. FIG. 7c shows two partial circumferential slits 38 and one or two partial longitudinal slits 56 where the unslit tab sections 32 are located at the intersection where the slitting edges of end blade 24 and straight blade 26 would intersect. FIG. 7d is a combination of the embodiments of FIG. 5 and 7b where there are two partial circumferential slits 38 and two partial longitudinal slits 56. FIG. 8 shows a slit arrangement located at the end of a wire segment. FIG. 9 shows opposed blade assemblies in contact with the wire insulation which can create the end of the wire slit configuration of FIG. 8.

Changes in construction will occur to those skilled in the art and various apparently different. modifications and embodiments may be made without departing from the scope of this invention. The matter set forth in the foregoing description and accompanying drawings is offered by way of illustration only.

What is claimed is:

1. A method for slitting insulation surrounding a conductor of a portion of an electrical wire between ends of said wire to facilitate removal of a section of the insulation, comprising the steps of:

simultaneously cutting two circumferential slits penetrating through the insulation down to the conductor perpendicular to the wire and at least one longitudinal slit penetrating through the insulation down to the conductor generally parallel to the wire and leading away from the circumferential slit; and leaving at least one completely unslit portion of the insulation in at least one of the circumferential and longitudinal slits having a length substantially less than the length of said circumferential or longitudinal slit to retain a section of the insulation on the conductor and which can be torn to remove the section with little force.

2. A method for slitting insulation surrounding a conductor in a wire to facilitate the removal of a section of insulation, said method including the steps of:

holding said wire in a selected position relative to a pair of opposed cutting blade assembles;

moving said cutting blade assemblies toward each other and toward said wire in a direction perpendicular to the longitudinal axis of said wire; and simultaneously cutting two circumferential and at least one longitudinal slits penetrating through said wire insulation down to the conductor where at least one of said circumferential and longitudinal slits is formed to have at least one completely unslit portion of insulating having a length substantially less than the length of said circumferential or longitudinal slit which retains a section of insulation bounded by slits on the conductor which can be torn to remove the slit bounded section with little force.

* * * * *